United States Patent [19]
Hays et al.

[11] Patent Number: 4,789,255
[45] Date of Patent: Dec. 6, 1988

[54] CORRECTION BUFFER

[75] Inventors: Douglas E. Hays; James F. Lederer, both of Lexington, Ky.

[73] Assignee: International Business Machines Corporation, Armonk, N.Y.

[21] Appl. No.: 53,890

[22] Filed: May 26, 1987

[51] Int. Cl.⁴ .................................................. B41J 5/31
[52] U.S. Cl. .......................................... 400/63; 400/70; 400/279; 400/303
[58] Field of Search ..................... 400/63, 70, 76, 279, 400/306, 303, 307.2; 364/900

[56] References Cited
U.S. PATENT DOCUMENTS

| | | | |
|---|---|---|---|
| 3,618,032 | 11/1971 | Goldsberry et al. | 340/172.5 |
| 3,913,721 | 10/1975 | Koplow | 400/63 |
| 3,999,168 | 12/1976 | Findley | 400/306 X |
| 4,476,542 | 10/1984 | Crean | 364/900 |

*Primary Examiner*—Paul T. Sewell
*Attorney, Agent, or Firm*—John J. McArdle, Jr.

[57] ABSTRACT

A correction buffer for a typing system in which the correction buffer has a group of records, each record corresponding to an incremental distance on the medium which is printed upon. The records in the correction buffer contain information concerning characters entered through a keyboard by a typist including designations of entered characters and character attributes.

7 Claims, 10 Drawing Sheets

CORRECTION BUFFER

BACKGROUND OF THE INVENTION

This invention relates generally to systems for processing character information supplied from an input device and for providing character information to a printing apparatus. The invention more particularly concerns such a system in which character information is stored in a correction buffer.

There are a number of systems which process character information from an input device to drive a printing apparatus. Typically, the input device takes the form of a keyboard and the character information which is processed comprises incoming keystrokes. Usually, such systems also produce character information derived from the incoming keystrokes to be supplied to a display as well as to a printer.

An electronic typewriter, for example, generally includes a keyboard, a single line display, a printer apparatus, and an operating system to interface among the keyboard, the display, and the printer. Usually, the display, the printer assembly, and the operating system circuitry are contained in a single unit.

As another example, a personal computer system may be operated under software control to function as an electronic typewriter. One such system includes a microcomputer system unit, a keyboard, a display, and a printer.

In the first-mentioned exemplary electronic typewriter system, an operator depresses keys on the keyboard, and keystrokes are coupled to a microprocessor-based operating system in the typewriter. The operating system functions to provide information to the display and to the printer assembly and has associated memory for storage and retrieval of keystroke information developed from the keystrokes.

In such an electronic typewriter system, keystrokes are processed to place suitable keystroke information in a storage location known as a correction buffer, which contains, for example, keystroke information related to a single line of alphanumeric text. The keystroke information remains in the correction buffer so that the operator can enter, via the keyboard, modifications to the stored line of text such as deletions of characters or changes to characters.

In past electronic typewriter designs, characters have been stored in the correction buffer in a one-dimensional array in memory. This array of characters is intermixed with special codes indicating, for example, tab locations, overstrikes, and centered text. Relatively complex algorithms must then be employed to scan through the correction buffer to locate a particular character or characters intermixed with the special codes.

In such systems, pointers are maintained by the operating system for indicating the current positions for adding keystroke information to the correction buffer and for adding a character to the display. A pointer is also maintained for the position of the printhead along the current print line on the printer. As keystrokes are entered through the keyboard, keystroke information is added to the correction buffer, and to the display memory, and sent to the printer to move the printhead, as appropriate. As the keystrokes are processed, the various pointers are updated so that the correct locations for the entry of subsequent keystroke information are known.

In such systems, when printhead movement commands, such as tab commands, are received from the keyboard, the character information intermixed with special codes contained in the correction buffer must be scanned in a relatively time-consuming manner to determine the correct value to which to update the correction buffer pointer.

It is also difficult to perform operations dependent upon specific location of characters on paper by the print mechanism. For example, it has been difficult to center new text to the left of existing text on a line and to use various functions such as underscoring within centered text, due to the complexities of performing centering in conjunction with the entry of special printing codes in the correction buffer.

In some cases the display has a capacity which is less than the character storage capacity of the correction buffer. This results in a need to rewrite the display (rewrite the display memory) as the operating system moves to different locations in the correction buffer. It has been difficult and time-consuming to do this from the correction buffer, with its sequences of character and special code information.

It is the general purpose of the present invention to provide an improved correction buffer structure which eliminates many of the shortcomings enumerated above with regard to the correction buffers utilized in previous systems.

SUMMARY OF THE INVENTION

In carrying out the invention, a correction buffer is provided which comprises a group of records, each record corresponding to an incremental distance on the medium to be printed upon.

In one embodiment of the invention, the correction buffer is implemented in a personal computer system operated under the control of software to simulate the operation of a typewriter. In this system, the correction buffer stores the information for a line of text in a sequence of identical cells, or records. One record contains all of the information necessary to describe the text present at one location on the medium upon which information is to be printed (hereinafter, paper).

It is possible to easily scan through the correction buffer, since a series of identical records is scanned. Thus, there is no need to interpret and process each byte of storage in the correction buffer during scanning to determine whether the bytes of storage are representative of characters or special codes, which may be of different lengths.

Advantageously, since each record is correlated to a specific X position on the paper, it is easy to determine where each character will print. The software to handle text stored in this manner is flexible enough to be used in special operations, such as centering, thus allowing almost all operations in such a mode as are allowed in normal typing.. If the display must be rewritten from a portion of the correction buffer, this is also readily accomplished.

In utilizing this form of correction buffer, an X variable (a program variable indicative of the current X position in the correction buffer) is updated as keystroke information is processed into the records in the correction buffer. The location for keystroke information to be supplied to the display is calculated based upon the correction buffer X position, and the print position on the paper corresponds to the current correction buffer X position variable value. There are no special codes interrupting the correction buffer records to be processed in order to determine a pointer location for the correction buffer. For example, when printhead movement commands are processed, no complex calculations are necessary to find the new X position in the correction buffer, since the correction buffer locations correspond directly to printhead positions along a line on the paper.

Further objects and advantages of the invention, and the manner of their implementation, will become apparent upon reading the following detailed description and upon reference to the drawing in which:

DETAILED DESCRIPTION

While the invention is susceptible to various modifications and alternative forms, a specific embodiment thereof has been shown by way of example in the drawing and will herein be described in detail. It should be understood, however, that it is not intended to limit the invention to the particular form disclosed, but, on the contrary, the intention is to cover all modifications, equivalents, and alternatives falling within the spirit and scope of the invention as described by the appended claims.

Figure 1:
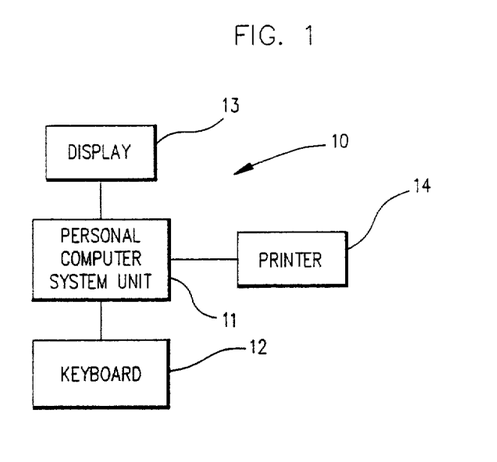
FIG. 1 is a block diagram of a personal computer system in which the present invention is implemented.

Turning initially to FIG. 1, a personal computer system 10 includes a system unit 11 connected to a keyboard 12, a display 13, and a printer 14. In the illustrated form of the invention, the personal computer system 10 comprises a personal computer system unit including a microprocessor from the Intel 8086/8088 family of microprocessors. The system unit 11 includes a disk drive for loading application software and operating system software and suitable interfaces to the display 13 and the printer 14. The system unit 11 is coupled to the keyboard by a standard bidirectional serial interface and to the printer 14 by a standard parallel printer interface. The system unit 11 is under the control of a disk operating system (DOS) and basic input/output system (BIOS), which, inter alia, define a video RAM memory segment for display information.

In the present instance, the system unit 11 is operated under the control of an application program which emulates the operation of an electronic typewriter. This software defines memory locations comprising a correction buffer for storing a current line of text. In a "key-to-print" mode, as keystrokes are entered at the keyboard 12, the keystrokes are coupled to the system unit 11 and processed. As keystrokes from the keyboard 12 are processed, characters defined by the keystrokes are displayed in the display 13 and printed on paper by the printer 14. This system is also operable in a "delay print" mode in which characters are displayed in response to keystrokes as the keystrokes are entered at the keyboard, but printing is deferred and performed later, on a line-by-line basis.

In accordance with the invention, the application program defines memory locations which make up a correction buffer for storing a current line of text, and the correction buffer memory locations are correlated to specific positions of the printhead along a line of printed text.

Figure 2:
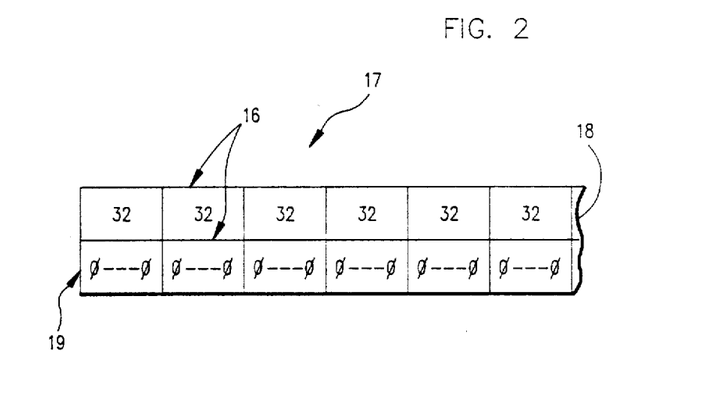
FIG. 2 is a diagrammatic illustration of a portion of a correction buffer in accordance with the present invention.

With reference now to FIG. 2, a group of records 16 makes up a portion of a correction buffer 17 formed in accordance with the present invention. The correction buffer 17 is an array formed upon initialization of the typewriter simulation application program. Each record in the correction buffer includes an ASCII code character (or graphic) portion 18 and an attribute portion 19. In the present correction buffer, the character portion of a record is one eight-bit byte in length, and the attribute portion of a record is also one eight-bit byte in length, containing eight attribute bits.

One record in this correction buffer corresponds to 1/60 of an inch (termed herein a "unit space" ) along a line on the paper in the printer. Therefore, if a position in the correction buffer is known, then the location of a character on paper is known, which in turn provides a known position for the printhead to print the character. The location of the character in the display can also be derived from the correction buffer position based upon the relative size of the display and the correction buffer. Advantageously, the correction buffer records are designated by sequential addresses to facilitate the correlation between the records and printhead positions.

In the present system, characters are printed in 10, 12 or 15 pitch (characters per inch). Since there are 60 unit spaces per inch, and hence 60 correction buffer records per inch, in 10 pitch, there are 6 records per character position on paper. In 12 pitch, there are 5 records per character position, and in 15 pitch, there are 4 records in the correction buffer per character position. Also in the present system, if characters are printed "double-wide", the characters are in effect "stretched" over two character positions, and each double-wide character, in 10 pitch for example, therefore corresponds to 12 records in the correction buffer. Analogously, 10 correction buffer records correspond to one double-wide, or expanded, character in 12 pitch, and in expanded 15 pitch, there are 8 correction buffer records per character position. In the following illustrative examples, operation of the system in 10 pitch, non-expanded, will be presumed. The records shown in FIG. 2, therefore, correspond to the six records for one character width.

After the correction buffer records are created and initialized, before keystroke information is processed into the correction buffer, each record is established to contain the ASCII code for a space (shown as a decimal "32") in the character byte of the record, and each record contains eight bits set to zeroes in the attribute byte of the record.

Figure 3:
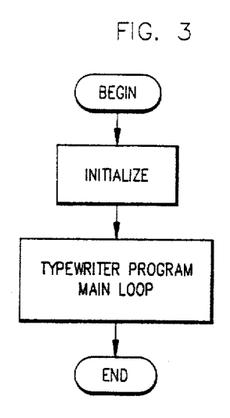
FIG. 3 is a flowchart of a typewriter application program for the personal computer system of FIG. 1.

In operation, the typewriter simulation software employing the correction buffer permits the emulation of an electronic typewriter by the personal computer system 10 of FIG. 1. Referring to FIG. 3, in executing the typewriter simulation software, the processor in the personal computer system unit 11 first initializes the system (including the creation and initialization of the correction buffer) and then executes a typewriter program main loop. With additional reference to FIG. 4, a principal activity in the typewriter program main loop is the process of looping to capture keystrokes and to supply the appropriate keystroke information to the printer, the display, and the correction buffer.

Figure 4:
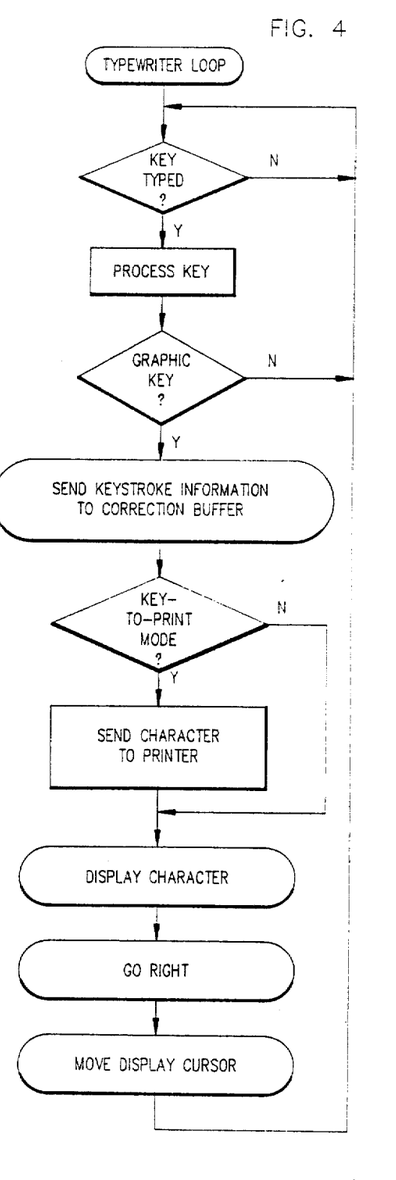
FIG. 4 is a flowchart of the principal functions of the typewriter loop in the typewriter program of FIG. 3.

With further reference to FIG. 4, in looping to capture keystrokes, the processor first determines if a key has been typed, and once the processor recognizes that a key has been typed, the key is processed. In some cases, the keystroke data received from the keyboard is not representative of a graphic character to be displayed and printed. In some cases, the keystroke calls for a mode change, such as a command to print subsequent characters in expand (double-wide) mode. Other non-graphic keystrokes include printer or paper movement commands and the like. For the present purposes of explanation of the correction buffer, discussion shall be centered primarily upon the processing of keystrokes representative of graphic characters. Certain illustrative examples of processing non-graphic keystrokes will subsequently be given, showing their relationship to the correction buffer structure described herein.

Returning to FIG. 4, if the keystroke is not representative of a graphic character key (or a key to be processed as a graphic, as shall be described hereinafter), the processor returns (having already processed the keystroke) and continues looping looking for additional keys.

If the key which has been depressed is representative of a graphic character, the "Process Key" step has substantially passed the key to the "Graphic Key" decision point. Then the processor sends keystroke information for the graphic character to the appropriate location in the correction buffer. This procedure shall be described in more detail subsequently.

The processor next determines if the system is in a direct key-to-print mode, and if so sends the appropriate print information to the printer. The processor then effects the displaying of the graphic character in the display, moves to the right in the correction buffer (to the next character position, as shall be described subsequently) and moves the display cursor. Each of these three operations shall also be described in more detail hereinafter.

Turning now to FIG. 5, the process of sending keystroke information to the correction buffer shall be described in more detail. In processing a graphic character keystroke, the processor first determines if the keystroke represents the depression of the spacebar on the keyboard. If the spacebar has been depressed, and the system is not in underscore mode, the processor returns from the routine for sending keystroke information to the correction buffer, and the correction buffer contents are not changed. If the key was the spacebar, and the underscore mode is on, the keystroke is converted to an underscore graphic character. The underscore graphic, or a non-spacebar key, is then entered into the correction buffer, as will be described.

Prior to discussing the entry of character information into the correction buffer, certain descriptive terms used in regard to the records in the correction buffer will be defined. The "X variable", or "X position variable" is a variable maintained by the typewriter simulation software. The value of this variable (the X position) is a location in the correction buffer. Normally, this location is the address of the record into which keystroke information is to be next written.

Figure 6A:
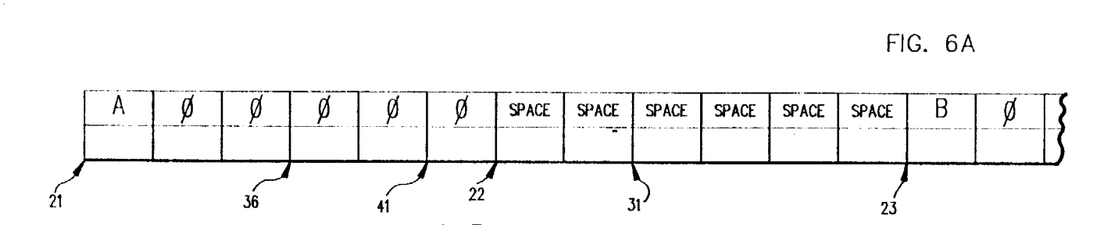
FIG. 6A is a diagrammatic illustration of a portion of a correction buffer in accordance with the present invention.
Figures 6B, 7A:
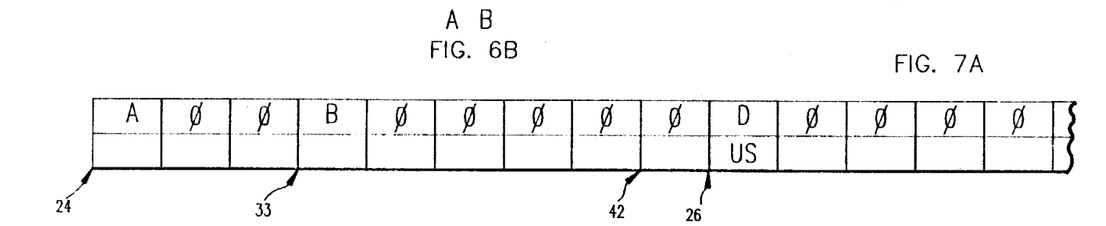
FIG. 6B shows the positioning of characters on paper corresponding to the correction buffer information of FIG. 6A.
FIG. 7A is a diagrammatic illustration of a portion of a correction buffer in accordance with the present invention.
Figures 7B, 8A:
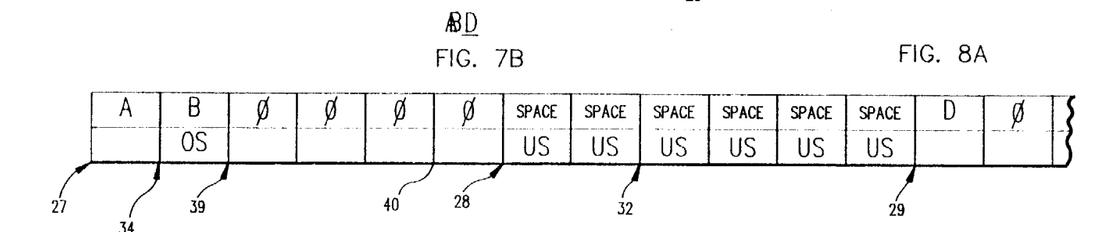
FIG. 7B shows the positioning of characters on paper corresponding to the correction buffer information of FIG. 7A.
FIG. 8A is a diagrammatic illustration of a portion of a correction buffer in accordance with the present invention.
Figure 8B:
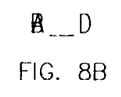
FIG. 8B shows the positioning of characters on paper corresponding to the correction buffer information of FIG. 8A.

With reference to FIGS. 6-8, each of which illustrates a portion of a correction buffer formed in accordance with the present invention, the X position in the correction buffer is to the left of the next record (equivalent to one unit space) where character information is to be placed in the correction buffer. For example, the reference numeral 21 in FIG. 6A identifies the X position at the beginning of the correction buffer segment shown in FIG. 6A. Herein, the reference numeral 21, for example, shall also be deemed to indicate the record to the right of the arrow, in this case the record containing the graphic "A".

As will be developed, the X position in the correction buffer is directly related to the position of the printhead on the printer along the current print line on the paper and also serves as the basis for determining the cursor location in the display.

Continuing with definitions of descriptive terms, a "root character" shall mean a graphic character or space stored in a record in the correction buffer which is not overstruck over the top of another character. Root characters are indicated, for example, in FIG. 6A by reference numerals 21, 22, 23 and 31. Root characters are also indicated, in FIG. 7A, by the reference numerals 24, 33 and 26, and in FIG. 8A by the reference numerals 27, 28, 29 and 32. A root character which is not a space shall be designated herein as a graphic root character.

As will be recalled, when the correction buffer is initialized, each character graphic portion of a record contains an ASCII space (Decimal 32) and each attribute portion of the record contains all (eight) zeros. When a character such as the "A" in FIG. 6A is entered into the correction buffer, the ASCII code for a capital "A" is entered into the graphic portion of the record 21, and no change is made to the attribute bits in the attribute portion of the record. Succeeding records are also changed from an ASCII space to an ASCII zero (all bits zero). These succeeding records are termed "continued" records. As discussed earlier, the number of succeeding (continued) records associate with the record containing the capital "A" is dependent upon the pitch of the printer. In the exemplary situation of 10 pitch, the record 21 contains the capital "A" and the five succeeding records are changed to an ASCII zero.

A "space" is defined as a record containing an ASCII space, and thus in which no graphic or ASCII zero is stored, although an underscore attribute bit (one of the eight attribute bits) may or may not be set at that location. See, for example, the records 22 and 31 in FIG. 6A and the records 28 and 32 in FIG. 8A.

The term "whitespace" shall refer to a space in which no attribute bits are set. The records 22 and 31 in FIG. 6A are illustrative of whitespaces. The term "unit space", which has been used earlier, in the present instance is related to a distance of 1/60 of an inch on paper, and is equal to one record in the correction buffer.

If sequential characters and spaces (a series of words, for instance) are keyed in by an operator at the keyboard, graphic root characters (with associated "continued" records) and spaces, as already defined, are entered into the correction buffer. The present correction buffer structure also supports the entry of overstruck and partially overstruck characters.

An example of the storage of a partially overstruck character in the correction buffer is shown in FIG. 7A. The record 33, containing the graphic character "B", is positioned within the six record correction buffer space of the "A", which begins at the record 24. Note that, as shown in FIG. 7B, the resultant characters printed on paper are a "B" partially overstruck on a capital "A". Note also that in the correction buffer, the record 33 containing the capital "B" begins a six record portion of the correction buffer despite the fact that it is partially overstruck over the capital "A". Therefore, the X position for a subsequent character (after the "B") is placed at the record 26 so that the next graphic character (capital "D") is located with a normal spacing from the preceding capital "B".

Since each record is sized to receive the ASCII code for only one character, it is not possible to write two characters in a single record to indicate a direct overstrike. In order to indicate a direct overstrike, the second character is entered in the record succeeding that of the first character, with an "overstrike" attribute bit (a second of the eight attribute bits) being set in the record for the second character. Note that in 10 pitch there are six records associated with the letter "A", and the directly overstruck "B" is placed in the second record (the record following that containing the "A"). Additional characters directly overstruck over the "A" would be stored in the record 39 and succeeding records, and the "overstrike" attribute bit would be set in each such record. The direct overstrike, as it appears on paper, is shown in FIG. 8B.

Records following a root character record are typically in the form of the record 36 (FIG. 6A), which contains an ASCII "zero" graphic. FIGS. 6B, 7B and 8B show the appearance of characters printed on paper corresponding to the characters stored in the correction buffer segments shown in FIGS. 6A, 7A and 8A, respectively.

Returning to FIG. 5B, detailing the entry of keystroke information into the correction buffer, and after changing a space entered in underscore mode to an underscore graphic (if necessary), the processor first decides if the current X position (as determined by the value of the X position variable) is a space (including whitespace) or a record continued from a graphic root character. If this is not the case, the present record is either a graphic root character or a record in which the "overstrike" attribute bit is set. In the normal entry of characters from left to right in the correction buffer, the current X position after the entry of a character is on a whitespace. To the left of this whitespace is the last record with a "continued" bit set associated with the preceding character. Such a whitespace record is the record 22 in FIG. 6A.

Figure 5A:
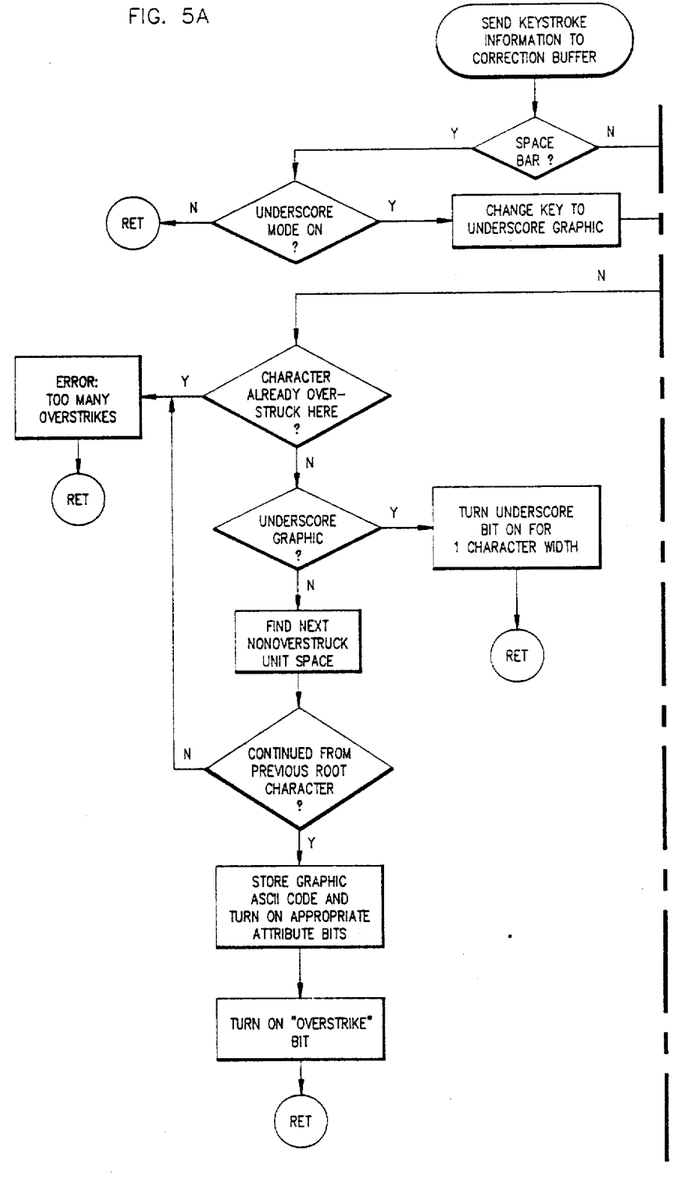
FIG. 5, in the form of FIGS. 5A and 5B to be joined together at the dashed lines therein, is a flowchart of a routine for sending keystroke information to the correction buffer contained in the typewriter loop of FIG. 4.
Figure 5B:
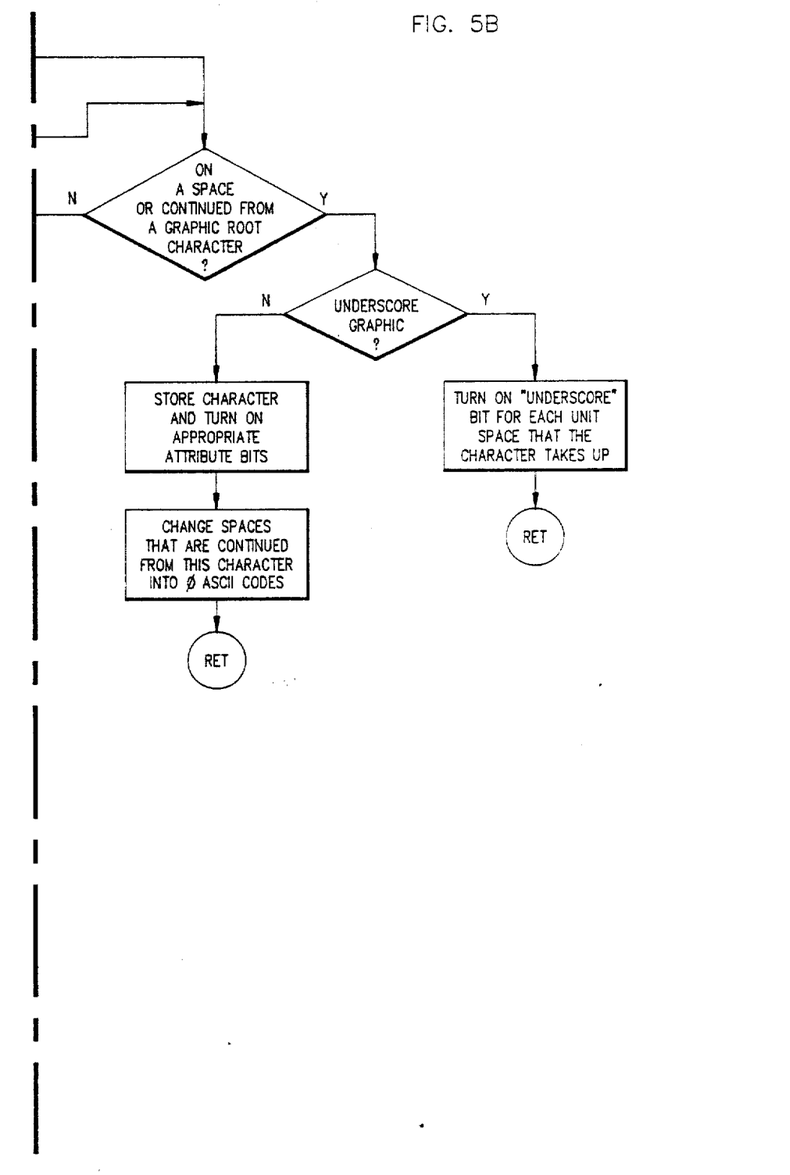

The sequence of steps for processing either a graphic root character or an overstruck character is shown in FIG. 5A. This is the less usual case, and will be discussed first. If the present record is not a space or continued from a graphic root character, the processor next determines if the "overstrike" bit is set. If so, an error message or indication is given to the operator and the processor returns to the Typewriter loop. If the "overstrike" bit is set in the present record, that indicates that a character is already overstruck at a location to the left of the present record; and the present record cannot store another overstruck character.

If the present record does not contain an "overstrike" attribute (meaning that the record contains a graphic root character), the processor next determines if the keystroke now being processed is an underscore graphic. If so, the underscore attribute bit is set for the present record and each successive record, for one character width. The processor then returns to the Typewriter loop.

If the keystroke being processed is not an underscore graphic, the processor looks to the right in the correction buffer to find the next record in which the "overstrike" bit is not set. An example of this would be with the X position at the record 27 (FIG. 8A). Starting with the correction buffer as illustrated in FIG. 8A, if, for example, a capital "E" were to be overstruck directly over the capital "A", the processor would move to the right through the records in the correction buffer, past the record 34 (whose overstrike bit is set) to the record 39, the next record in which the "overstrike" bit is not set. The value of the X variable itself is not changed in performing this procedure.

The processor next checks to see if this record is continued from a previous root character; that is, if there is an ASCII zero in the graphic portion of this record. In the case of the record 39, this is true.

If it were not true, it would mean that (for 10 pitch) five direct overstrikes had already been entered in the records following the record containing the capital "A" graphic. In the FIG. 8A situation, if the records 34 through 40 all had the "overstrike" bit set, the processor would move to the right until reaching the record 28. However, since the record 28 is no longer a record associated with the character graphic capital "A", it is not a suitable location for entering an overstruck character for the capital "A". Therefore, as a practical matter, for 10 pitch, there is a limit of five direct overstrikes permitted at a character location.

If, as would be the usual case, the first or second record encountered to the right of a graphic root character record is continued from that root character, the processor stores the graphic character in that record and turns on the appropriate attribute bits accompanying the graphic character. The processor also turns on the overstrike bit in the record and then returns to the Typewriter loop.

In the presently described correction buffer, the attribute bits utilized are superscript, subscript, expand, bold, underscore, and overstrike, with two bits being reserved for future designation.

Returning to the decision point (FIG. 5B) at which the processor determines if the present record is a space or continued from a graphic root character, the situations where neither of these conditions is true have been discussed. In the more likely event that the record is either a space or continued from a graphic root character, the processor then determines if the keystroke presently being processed is an underscore graphic. If so, the underscore attribute bit is turned on for the present record and each succeeding record for one character width. For example, if the present X position were the record 36 (FIG. 6A), the processor would set the "underscore" attribute bit in the records 36 through 31. If the present position in the correction buffer is at a space, the "underscore" attribute bit is turned on for each record making up one character width, in the present instance, six records, beginning with the present record and moving to the right.

For graphic characters other than an underscore graphic, the processor proceeds to store the character graphic in the graphic portion of the present record and turns on the appropriate attributes associated with in the graphic portion of each of the succeeding records up to a maximum of five records (for 10 pitch) or until encountering a record other than a whitespace. The processor then returns to the Typewriter loop from the routine for entering keystroke information in the correction buffer.

An example of the entry of a graphic character into the correction buffer beginning at a space is shown in the records 21 through 41 (FIG. 6A). An example of the entry of a graphic character into the correction buffer beginning at a "continued" record is shown in the records 33 through 42 (FIG. 7A).

Returning to the typewriter loop description of FIG. 4, after keystroke information is sent to the correction buffer, as discussed in detail with regard to FIGS. 5 and 6 through 8, the processor then determines if keystrokes are to be supplied directly to the printer.

If so, the character information for the character to be printed is sent to the printer. In either event, the processor then performs subroutines to display the character, move the correction buffer X position to the right, and to move the display cursor in the display. Each of these subroutines shall be described in more detail subsequently. Following the execution of these routines, the processor returns to check again for a key which has been typed.

Figure 9:
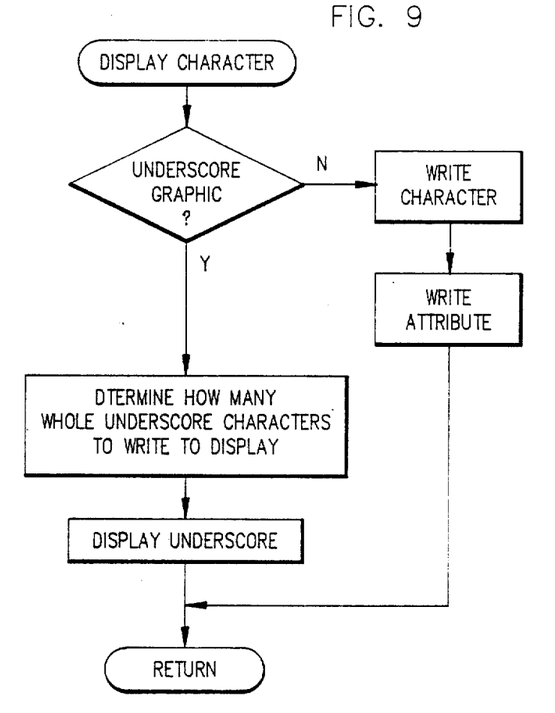
FIG. 9 is a flowchart of a routine for displaying a character contained in the typewriter loop of FIG. 4.

Turning now to FIG. 9, in order to display a character on the display, the processor first determines if the graphic character is an underscore graphic (underscored space). If it is not an underscore graphic, the character information is written to the video RAM in the system unit and the accompanying attribute information for the character is used to write suitable attribute information to the video RAM.

The character information from the correction buffer is readily written to the proper video RAM location for display. The present correction buffer has 792 records (132 characters wide in ten pitch). The present display has 76 character positions, corresponding to 76 video RAM locations. For the first 76 character-widths (six-record groups) in the correction buffer, ASCII character information is directly written into the corresponding video RAM locations. Beginning with the 77th character-width in the correction buffer (or a lower value such as the 71st character-width if screen overlap is desired), the video RAM is rewritten as a second "screen", with the 77th character-width of character information being written into the first video RAM location. Due to the fixed character boundaries of the present display, and the ability to shift characters by unit spaces on paper and in the correction buffer, certain decisions must be made concerning the exact positioning of character information in the display. However, such considerations are not critical to the present correction buffer implementation and shall not be discussed in detail.

After a character ASCII code is written to a location in the video RAM, the attribute bits set in the correction buffer for the character are used for producing appropriate attribute displays. For example, symbols may be placed above or below the character, or the color of the character might be changed if a color display is used. The particular approach taken to display character attributes based upon correction buffer contents is not critical to the present correction buffer structure and shall not be described further herein.

If the character to be displayed is an underscore graphic, the processor determines how many whole underscore characters should be written to the display for the underscore graphic. The underscores are then displayed, and the processor returns to the Typewriter loop from the Display Character subroutine.

After a character has been displayed, the processor updates the X position in the correction buffer so that the X position will be correct for the next character entered. To do this, a Go Right subroutine is executed. By the completion of the Go Right subroutine, a suitable number of unit space values are added to the X position variable. The general aim of the Go Right subroutine is to move to the right in the correction buffer to the beginning record of the next root character.

Figure 10:
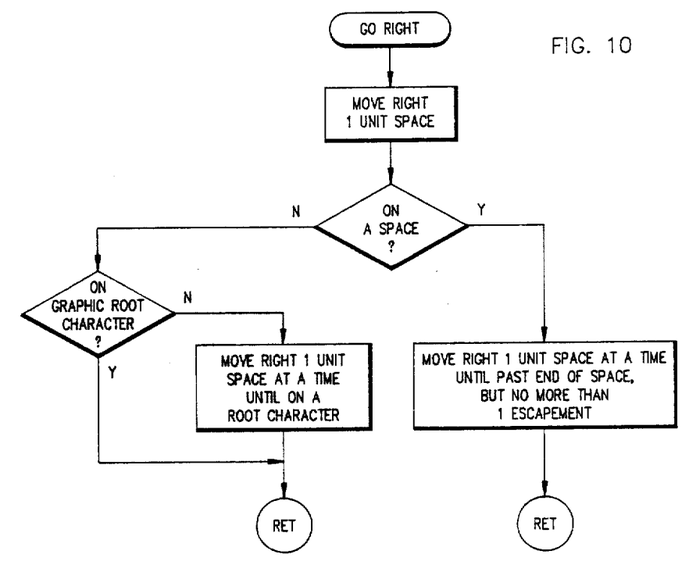
FIG. 10 is a flowchart of a Go Right routine used in the typewriter loop of FIG. 4.

With reference to FIG. 10, in executing the Go Right subroutine, the processor increments the X variable by one and determines if this record is a space. If it is not, the processor moves to the right one unit at a time until on a root character (which includes a space as well as a graphic root character), unless it is already on a graphic root character. Substantially, the processor moves to the right across records having an ASCII zero graphic or the "overstrike" bit set until arriving at the next root character record.

For example, referring to FIG. 7A, if the X position starts at the record 33, followed by entering the "B" keystroke into the correction buffer, the X position is then moved to the right six unit spaces to the record 26, where the root character "D" is encountered. As a further example, in FIG. 6A, if the X position starts at the point 21, followed by the "A" keystroke into the correction buffer, the processor updates the X position to the point 22, where a space is first encountered.

Returning to FIG. 10, if, after moving right one unit space, the record at the X position is a space, the processor then moves right one unit space at a time until past the end of the space, typically encountering a root character. However, the X position is incremented no more than one character's escapement, which in ten pitch is six character records. The processor also stops incrementing the X position if a transition from whitespace to underscored space (or the reverse) occurs.

Figure 11:
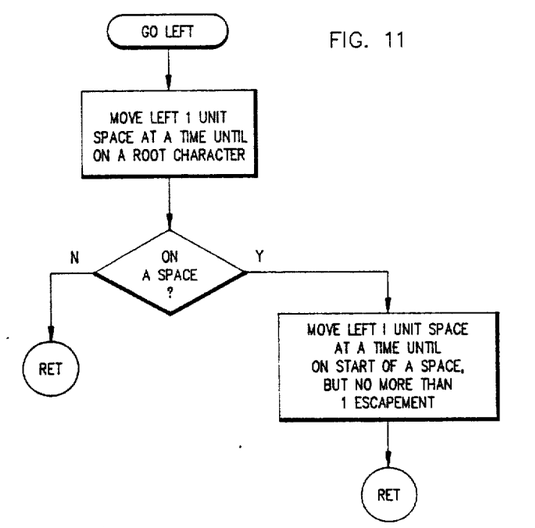
FIG. 11 is a flowchart of a Go Left routine used in a portion of the Process Key step of the typewriter loop of FIG. 4.

Moving to the left in the correction buffer is performed in a similar, but slightly different, manner. The general aim of the Go Left subroutine is to move to the left in the correction buffer to the first record of the previous root character. Referring to FIG. 11, in order to move left, the processor moves left one unit space at a time until on a root character (the definition of which, as stated earlier, includes a space). If this character record is not a space, the processor then returns from the Go Left subroutine. If the X position, after moving left one unit space, is a space, the processor continues to move left one unit space at a time until at the beginning of the series of "space" character records. However, the movement to the left through the correction buffer is never more than one character's escapement (six records in ten pitch). As in the case of the Go Right routine, the processor stops decrementing the X position variable if a transition from whitespace to underscored space (or the reverse) is noted.

For example, the Go Left subroutine would move the X position from the record 33 to the record 24 (FIG. 7A) or from the record 31 to the record 22 (FIG. 6A).

Returning to the series of routines in the typewriter loop shown in FIG. 4, after the Display Character and Go Right routines have been executed, the processor executes a routine to move the display cursor.

Figure 12:
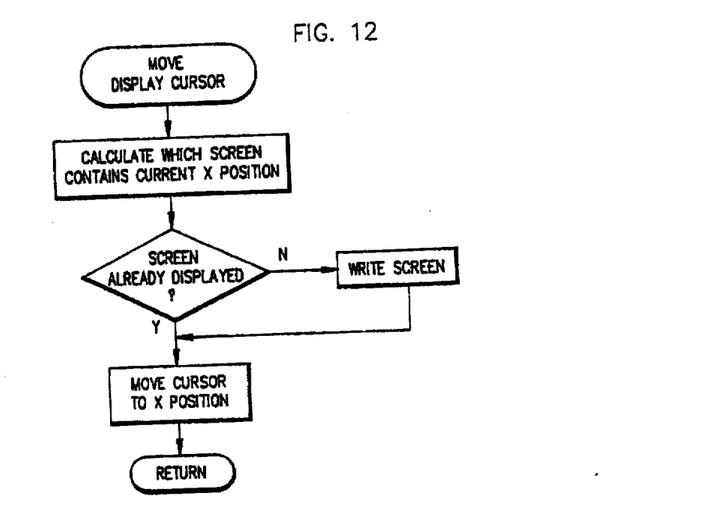
FIG. 12 is a flowchart of a Move Display Cursor routine used in the typewriter loop of FIG. 4.

With reference now to FIG. 12, the processor first calculates which screen for the display contains the current X position. In the present instance, the correction buffer (and the potential line width at the printer) is larger than the width of the display. Two, or even three, "screens" can be displayed on the display depending upon the pitch of the printer and which section of the correction buffer information is being viewed. Therefore, to be able to display the cursor on the correct screen, the processor determines which screen must be displayed in order to show the cursor at the current X position. This screen is displayed by writing appropriate character information to the video RAM from the correction buffer. In the case of the present "orderly" correction buffer, as discussed earlier, it is a straightforward conversion to determine the correction buffer character information to be stored at the various video RAM locations.

If the correct screen is not already displayed, the screen information is written from the correction buffer to the video RAM. The cursor position is calculated from the correction buffer X position and the cursor moved to that position by writing to the video RAM. The processor then returns to the typewriter loop.

In executing the typewriter loop, certain functions are performed in processing keys which are not character graphic keys. These routines are performed in the "process key" block in the typewriter loop. Certain of these key processing functions which call for movements within the correction buffer or changes to the display, are advantageously executed using the presently disclosed form of correction buffer.

Figure 13:
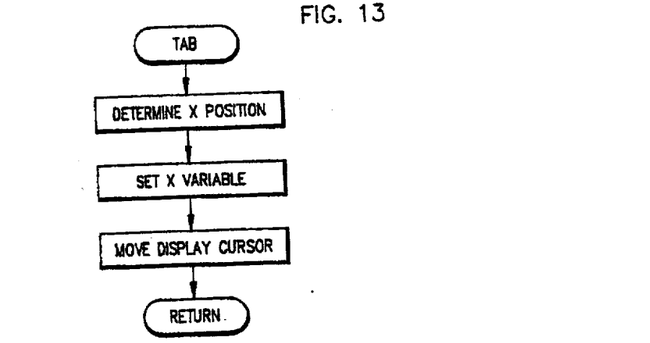
FIG. 13 is a flowchart of a Tab routine used in the Process Key step of the typewriter loop of FIG. 4.

One such routine is the processing of a tab key (FIG. 13). To process a tab keystroke, the processor looks up the appropriate tab position in a buffer, which advantageously corresponds in number of record positions to the correction buffer. The tab location which is looked up is thus equal in value to an X position in the correction buffer. This new X position, determined from the tab buffer, is entered for the X variable. With further reference to FIG. 13, after the X position has been determined and the X variable set to this X position value, the processor moves the cursor in the display utilizing the "Move Display Cursor" routine. The processor then returns from the Tab subroutine to the Typewriter loop.

Figure 14:
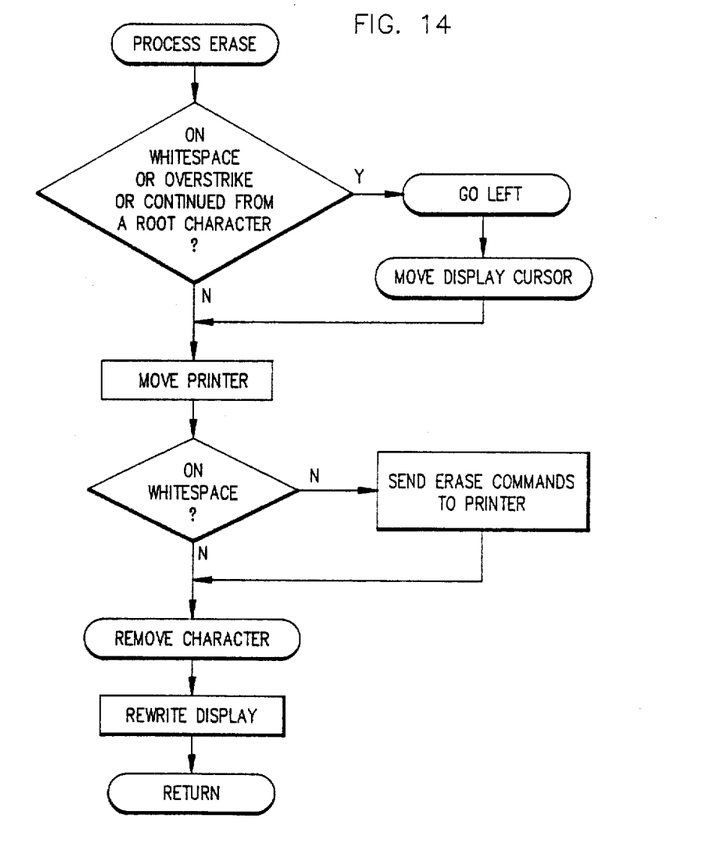
FIG. 14 is a flowchart of a Process Erase routine used in the Process Key step of the typewriter loop of FIG. 4.

Another key which is processed in the "process key" portion of the typewriter loop is an erase key. With reference to FIG. 14, in order to process an erase, the processor first determines if the X position is on a whitespace (a space where no attribute bits are set), on an overstruck record ("overstrike" bit set), or on a record which is continued from a root character. If so, the processor executes the "Go Left" subroutine. This moves the X position to a root character or across white space for a distance at most equal to one character's escapement width. The processor then moves the cursor in the display using the "Move Display Cursor" routine. If the record at the original X position is not a whitespace, an overstruck character, or a continued character, the record is a root character (graphic or space other than a whitespace). There is no need to execute the "Go Left" routine or to move the display cursor.

Having moved to the left (if necessary) through the correction buffer to the root character to the left of any continued or overstruck records, the record at the X position is now constrained to be a root character (graphic or underscored space) or a whitespace. If the record at the X position is not a whitespace, the processor then moves the printer to the correct position and sends an erase command to erase the root character, which may be a graphic character or an underscore. The printer is returned to the current X position and sent subsequent erase commands for each overstruck character following the root character.

The processor then executes a "Remove Character" subroutine to remove the appropriate character records from the correction buffer (as shall be described subsequently with regard to FIG. 15), and then rewrites the display to remove an erased root character from the display.

Figure 15:
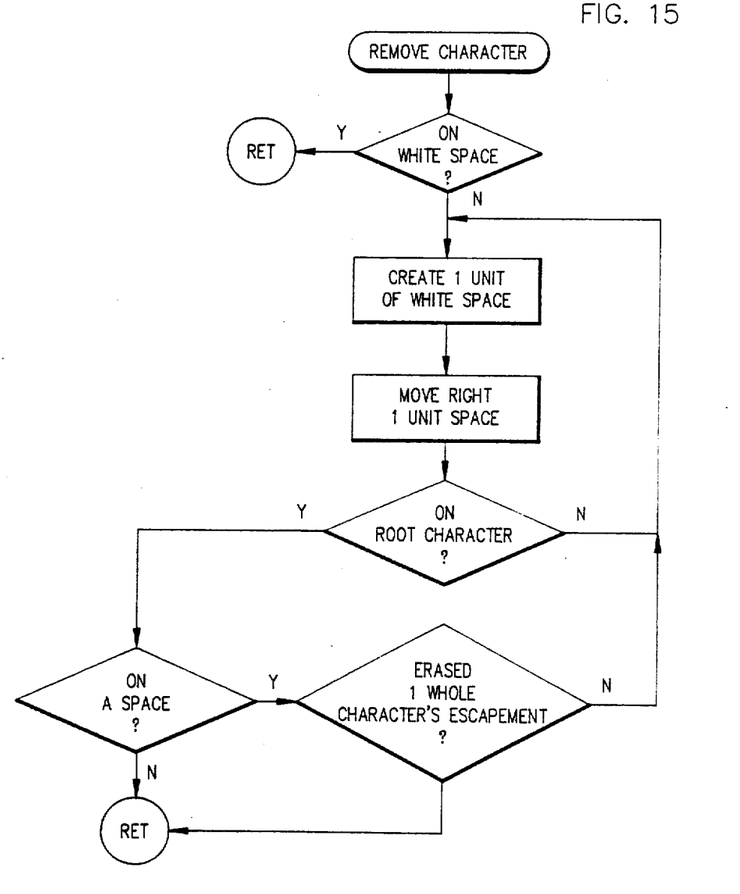
FIG. 15 is a flowchart of a Remove Character routine used in the Process Key step of the typewriter loop of FIG. 4.

Turning now to FIG. 15, to remove a character from the correction buffer, the processor first determines if the record at the X position is a whitespace. If so, the processor returns to the Typewriter loop since there is no character information to be removed from the correction buffer, nor any need to rewrite the display.

If the record at the X position is not a whitespace, the character record is constrained to be a root character (graphic or underscore) due to the previous execution of the "Process Erase" routine. The processor therefore creates one unit of white space and moves to the right one unit space in the correction buffer (although not now or subsequently in the "Remove Character" subroutine actually changing the value of the X variable). The processor then determines if it has reached a root character. If it has reached a graphic root character, then the entire character which was to be removed has been removed, and the processor returns to the "Process Erase" routine.

If the processor has not reached a graphic root character, the processor loops to create another unit of white space and move another unit right in the correction buffer. Since a space is a root character, if an underscore space is being removed from the correction buffer, after each root character decision, a determination is made that the processor is at a space. The processor then checks to see if one character's escapement width of spaces has been removed. If so, the processor returns to the "Process Erase" routine. If not, the processor loops and creates another unit of white space and moves right another unit space in the correction buffer.

After the "Remove Character" subroutine has been executed, the X position remains at the beginning of the just-created space in the correction buffer, so that the X position is correct for replacing the removed character with another character.

What is claimed is:

1. In a system for printing characters on a print medium in response to the input of character information from an input device, including a correct ion buffer for storing character information from the input device in the form of character codes, the improvement comprising: a correction buffer having a group of records, each record being capable for storing a different character code and each record corresponding to an incremental distance on the print medium such that a character on the print medium spans a distance greater than said incremental distance.

2. The improvement of claim 1 in which the system for printing characters is responsive to the input of character information from a keyboard.

3. The improvement of claim 1 in which the records in the correction buffer are substantially identical, with each record corresponding to the same incremental distance on the print medium and in which a character on the print medium spans a distance equal to a plurality of said incremental distance.

4. In a system for printing characters on a print medium in response to the input of character information from an input device, including a correction buffer for storing character information from the input device, the improvement comprising: a correction buffer having a group of records, each record corresponding to an incremental distance on the print medium and each record in the group of correction buffer records having a first portion for storing graphic character information and a second portion for storing attribute information.

5. In a typing system having a keyboard, a print mechanism, and a display, a control system for processing keystrokes entered through the keyboard to display characters on the display and to print characters on a print medium at the print mechanism, the control system comprising:
   means for defining a correction buffer having a group of identical record locations, each being capable of storing a different keystroke and each corresponding to an incremental distance on the print medium such that a character on the print median spans a distance greater than said incremental distance;
   means for entering character information in the record locations in the correction buffer in response to the entry of keystrokes through the keyboard; and
   means for displaying characters on the display in locations which are related to the correction buffer record locations for character information corresponding to the characters displayed.

6. In a system for printing characters on a print medium in response to the input of character information from an input device, a method for storing character information from the input device in the form of character codes comprising the steps of:
   defining a correction buffer having a group of identical record locations, each being capable of storing a different character code and each corresponding to an incremental distance on the print medium such that a character on the print medium spans a distance greater than said incremental distance; and
   entering character code information in the record locations in the correction buffer in response to the input of character information from the input device.

7. The method of claim 6 in which the input device is a keyboard and in which the step of entering character information in the record locations in the correction buffer is in response to the entry of keystrokes through the keyboard.

* * * * *

UNITED STATES PATENT AND TRADEMARK OFFICE
CERTIFICATE OF CORRECTION

PATENT NO. : 4,789,255

DATED : December 6, 1988

INVENTOR(S) : D. E. Hays et al

It is certified that error appears in the above-identified patent and that said Letters Patent is hereby corrected as shown below:

Column 8, line 9          Delete "15"

Column 9, line 34          After "with" insert --the character.

The processor then places a zero                                             ASCII code--

Signed and Sealed this

Twelfth Day of September, 1989

Attest:

DONALD J. QUIGG

*Attesting Officer*          *Commissioner of Patents and Trademarks*